(12) United States Patent
Bastide et al.

(10) Patent No.: US 11,163,433 B2
(45) Date of Patent: Nov. 2, 2021

(54) DISPLAYING CONTENT WITHOUT OBSCURING KEY DETAILS ON A COMPUTER SCREEN

(71) Applicant: International Business Machines Corporation, Armonk, NY (US)

(72) Inventors: Paul R. Bastide, Ashland, MA (US); Robert E. Loredo, North Miami Beach, FL (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/125,931

(22) Filed: Dec. 17, 2020

(65) Prior Publication Data

US 2021/0103381 A1 Apr. 8, 2021

Related U.S. Application Data

(63) Continuation of application No. 15/975,330, filed on May 9, 2018, now Pat. No. 10,936,174.

(51) Int. Cl.
*G06F 3/0484* (2013.01)
*G06F 3/0486* (2013.01)
*G06F 3/01* (2006.01)
*G09G 5/14* (2006.01)

(52) U.S. Cl.
CPC .......... *G06F 3/04845* (2013.01); *G06F 3/013* (2013.01); *G06F 3/0486* (2013.01); *G09G 5/14* (2013.01); *G09G 2340/12* (2013.01)

(58) Field of Classification Search
CPC .... G06F 3/04845; G06F 3/0486; G06F 3/013; G06F 3/0481; G06F 3/04842; G09G 5/14; G09G 2340/12; G09G 2354/00
See application file for complete search history.

(56) References Cited

U.S. PATENT DOCUMENTS

| | | | |
|---|---|---|---|
| 6,636,245 | B1 | 10/2003 | Estipona |
| 6,873,341 | B1 | 3/2005 | Adams et al. |
| 2013/0265227 | A1 | 10/2013 | Julian |
| 2014/0258918 | A1 | 9/2014 | Morishima et al. |
| 2015/0378572 | A1 | 12/2015 | Brown et al. |

OTHER PUBLICATIONS

List of IBM Patents or Patent Applications Treated as Related, Jan. 11, 2021, pp. 1-2.

*Primary Examiner* — Andrey Belousov
(74) *Attorney, Agent, or Firm* — Robert A. Voigt, Jr.; Winstead PC

(57) ABSTRACT

A method, system and computer program product for displaying content without obscuring key details on a computer screen. After the computing system detects the display of overlapping application windows, objects in the application windows are detected using an object recognition service. A determination is then made as to which of these detected objects correspond to objects that are being focused by the user, will be focused by the user and/or have been focused by the user based on the tracking of the eye gaze of the user and/or prior recorded patterns of activity. A score may then be generated for each of these focused objects indicating a level of obstruction using the location of the focused objects, the location of overlays and/or prior recorded patterns of activity. An optimal layout of the overlapped application windows is determined in response to the score for the focused object(s) exceeding a threshold value.

20 Claims, 6 Drawing Sheets

DISPLAYING CONTENT WITHOUT OBSCURING KEY DETAILS ON A COMPUTER SCREEN

TECHNICAL FIELD

The present invention relates generally to computing devices, and more particularly to displaying content without obscuring key details on a computer screen.

BACKGROUND

Computing devices, such as tablet computers and mobile devices, often display multiple application windows to the user. For example, the computing device may display a social media application in one window, a video application in a second window, a news application in a third window and a sports application with sports scores in a fourth window.

Unfortunately, such application windows may overlap each other, such as when the user converts a current window into a small moveable picture-in-picture window, such as via the picture-in-picture mode in the Android® operating system, or when the user receives a toast notification (window used to display brief, auto-expiring information to the user).

When such an event occurs, the user may be prevented from reading or watching the content (e.g., video) desired to be read or watched by the user. For example, the user may be prevented from viewing the sports scores due to the overlap of the application window displaying video with the application window displaying sports scores.

Currently, the user must manually reposition the overlapped application window covering up, at least a portion, of the content desired to be read or watched. By manually repositioning the overlapped application window, computing resources (e.g., processing resources) are wasted as well as the user's time.

Unfortunately, computing devices do not currently have the functional means for preventing the necessity of the user manually repositioning the overlapped application window(s).

SUMMARY

In one embodiment of the present invention, a computer-implemented method for displaying content without obscuring key details on a computer screen comprises determining details of application windows. The method further comprises determining a location of overlays between the application windows using the determined details of the application windows. The method additionally comprises detecting objects in the application windows using an object recognition service. Furthermore, the method comprises determining a location of the detected objects. Additionally, the method comprises determining which of the detected objects are focused by a user based on tracking eye gaze of the user or prior recorded activities of the user. In addition, the method comprises generating a score for each of one or more focused objects indicating a level of obstruction using the location of the detected objects which correspond to focused objects and the location of overlays between the application windows. The method further comprises determining an optimal layout of the overlapped application windows in response to the score for one or more of the one or more focused objects exceeding a threshold value. The method additionally comprises adjusting a display of one or more of the application windows to improve visibility of the one or more of the one or more focused objects using the determined optimal layout.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for displaying content without obscuring key details on a computer screen. In one embodiment of the present invention, after the computing system detects the display of overlapping application windows, various details of the application windows, such as its size and location, are determined. Furthermore, the location of the overlays between the application windows is determined using the obtained details of the application windows. Upon detecting objects in the application windows using an object recognition service, the location of the detected objects is determined. After determining the location of the detected objects, a determination is made as to which of these detected objects correspond to objects that are being focused by the user, will be focused by the user and/or have been focused by the user based on the tracking of the eye gaze of the user and/or based on prior recorded patterns of activity. A score may then be generated for each of these focused objects indicating a level of obstruction using the location of the detected objects which correspond to focused objects, the location of the overlays and/or prior recorded patterns of activity. An optimal layout of the overlapped application windows is determined in response to the score for the focused object(s) exceeding a threshold value. The "optimal layout," as used herein, refers to the layout of the overlapping application windows that eliminates the obstruction of the focused object(s) while using a minimal amount of screen area. The display of the application window(s) is then adjusted to improve visibility of the focused object(s) using the determined optimal layout. In this manner, the overlap of application windows affecting the user's ability to read or watch content may be prevented thereby preventing the manual repositioning of the application window(s) by the user.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
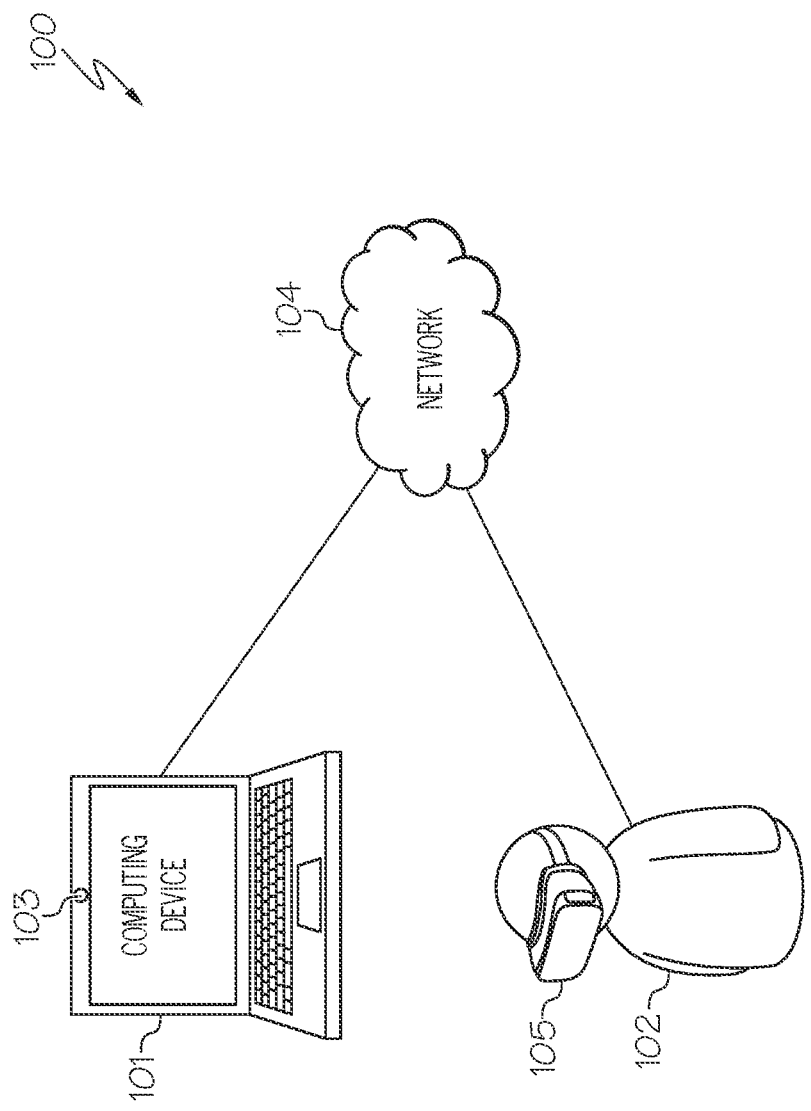
FIG. 1 illustrates a communication system for practicing the principles of the present invention in accordance with an embodiment of the present invention.

Referring now to the Figures in detail, FIG. 1 illustrates a communication system 100 configured in accordance with an embodiment of the present invention. System 100 includes a computing device 101 operated by a user 102. Computing device 101 may be any type of computing device (e.g., a portable computing unit, a Personal Digital Assistant (PDA), a mobile device, a tablet personal computer, a smartphone, a laptop computer, a mobile phone, a cellular phone, a navigation device, a gaming unit, a desktop computer system, a workstation, an Internet appliance and the like) configured with the capability of displaying multiple application windows to user 102 on a screen. A description of an embodiment of a hardware configuration of computing device 101 is provided below in connection with FIG. 2.

In one embodiment, computing device 101 utilizes an eye tracker 103 to track the eye gaze or focus of user 102. In one embodiment, eye tracker 103 is positioned on computing device 101 as shown in FIG. 1. Alternatively, eye tracker 103 may be head-mounted on user 102. In such an embodiment, the head-mounted eye tracker is connected to computing device via network 104.

Network 104 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In one embodiment, eye tracker 103 includes a light source and a camera. In one embodiment, the light source (usually infrared) is directed toward the eye. The camera tracks the reflection of the light source along with visible ocular features, such as the pupil. This data is used to extrapolate the rotation of the eye and ultimately the direction of gaze. Additional information, such as blink frequency and changes in pupil diameter, are also detected by eye tracker 103. The aggregated data is written to a file that is compatible with eye-tracking analysis software, such as EyeWorks™.

In one embodiment, eye tracker 103 corresponds to a web camera to track the eye gaze of user 102. In such an embodiment, the web camera detects the location of the face of user 102 followed by detecting the location of the eyes within the face of user 102 followed by detecting the orientation of the left and right eye and then mapping the orientation of the eyes onto the screen coordinate system. In one embodiment, the calibration is relied upon to perform the mapping. In one embodiment, the calibration is performed by exposing a number of calibration points on the screen and then asking user 102 to look at those points in order to build a model.

In one embodiment, user 102 may wear a virtual reality/augmented reality (VR/AR) headset 105 that includes a display providing a graphical environment for VR generation and/or AR generation. The graphical environment includes graphical images and/or computer-generated perceptual information. The display encompasses part or all of a user's field of view.

Exemplary embodiments of headset 105 include a visor, a helmet, goggles, glasses and other similar arrangements. Examples of VR/AR headsets 105 include Oculus Rift® from Oculus VR®, VIVE® from HTC® Corporation and Gear VR® by Samsung® Electronics. A further example of VR/AR headset 105 presently available is the HoloLens® from Microsoft®. Furthermore, in one embodiment, headset 105 may include any one or more of the following: headphones to provide auditory feedback, vibration means to provide vibration feedback, and other sensors placed on or around the forward facing surface when in use.

In one embodiment, headset 105 is utilized by user 102 to track the eye gaze or focus of user 102. For example, headset 105 may be equipped with eye tracking technology, such as developed by Tobii AB. To calibrate the tracking, user 102 will first have to follow a dot around the display for a while using his/her eyes. Afterwards, headset 105 will be able to track the eye gaze or focus of user 102.

In one embodiment, eye tracker 103 or VR/AR headset 105 identifies locations on the computer screen (display 215) that are focused by user 102 based on tracking the eye gaze of user 102, such as in terms of (x, y) coordinates. In one embodiment, such focused locations are determined based on the time that user 102 is gazing that location. For instance, if user 102 is gazing at a location, such as a location on the computer screen, that exceeds a threshold amount of time, then such a location is said to be a location focused by user 102. In one embodiment, such locations on the computer display are mapped to a screen coordinate system, such as (x, y) coordinates.

In one embodiment, in addition to identifying the location on the computer display that is being focused by user 102, eye tracker 103 or VR/AR headset 105 tracks the length of such interaction. That is, eye tracker 103 or VR/AR headset 105 tracks the length of time user 102 is focusing on a particular location on the computer display, which may correspond to an object (referred to as a "focused object") as discussed further below.

In one embodiment, the activities of user 102 tracked by eye tracker 103 and/or VR/AR headset 105 are stored in computing device 101 (e.g., disk unit 208). Such tracked activities include patterns of activity. For example, eye tracker 103 and/or VR/AR headset 105 may track the user's gaze on the computer display over a period of time (e.g., months). Using such information, computing device 101 may determine that after user 102 watches a video from a particular website, user 102 likes to tweet about what he/she has read in a Twitter® application, which always overlaps the video application window after user 102 converts the video application window into a small moveable picture-in-picture window, such as via the picture-in-picture mode. Such a pattern may be recorded and utilized by computing device 101 to determine focus objects (e.g., typing area in Twitter® application), even prior to user 102 actually performing the step of entering the video application window in picture-in-picture mode.

In one embodiment, eye tracker 103 or VR/AR headset 105 determines the reading or interaction speed of user 102 based on tracking the user's gaze.

System 100 is not to be limited in scope to any one particular architecture. System 100 may include any number of computing devices 101, users 102, eye trackers 103, networks 104 and VR/AR headsets 105.

Figure 2:
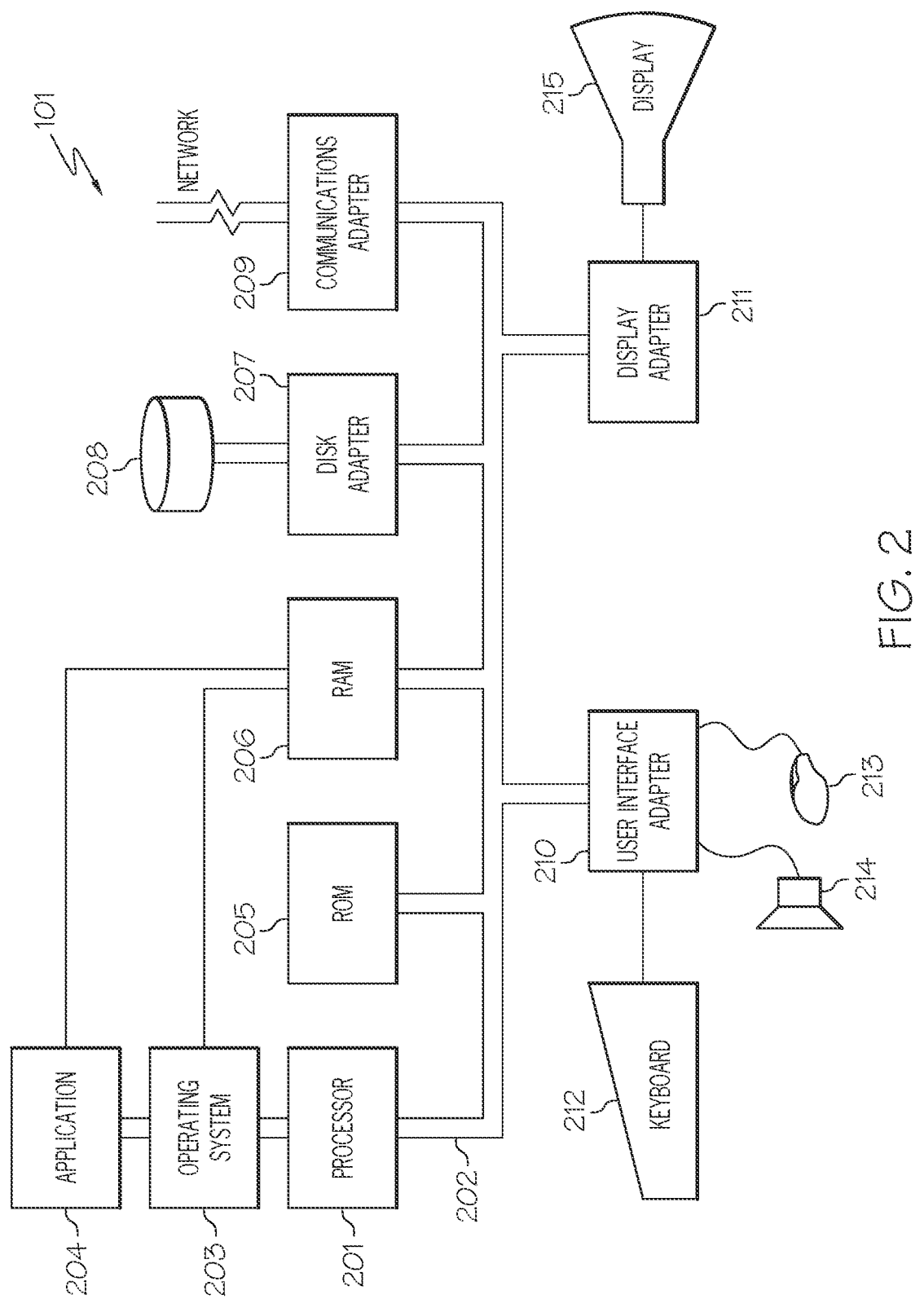
FIG. 2 illustrates an embodiment of the present invention of a hardware configuration of a computing device which is representative of a hardware environment for practicing the present invention.

Referring now to FIG. 2, FIG. 2 illustrates an embodiment of the present invention of the hardware configuration of a computing device 101 which is representative of a hardware environment for practicing the present invention. Referring to FIG. 2, computing device 101 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, eye-tracking analysis software or a program for displaying content without obscuring key details on a computer screen as discussed further below in connection with FIGS. 3A-3B and 4-6.

Referring again to FIG. 2, read-only memory ("ROM") 205 may be coupled to system bus 202 and include a basic input/output system ("BIOS") that controls certain basic functions of computing device 101. Random access memory ("RAM") 206 and disk adapter 207 may also be coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for displaying content without obscuring key details on a computer screen, as discussed further below in connection with FIGS. 3A-3B and 4-6, may reside in disk unit 208 or in application 204.

Computing device 101 may further include a communications adapter 209 coupled to bus 202. Communications adapter 209 may interconnect bus 202 with an outside network thereby allowing computing device 101 to communicate with other devices.

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, computing devices, such as tablet computers and mobile devices, often display multiple application windows to the user. For example, the computing device may display a social media application in one window, a video application in a second window, a news application in a third window and a sports application with sports scores in a fourth window. Unfortunately, such application windows may overlap each other, such as when the user converts a current window into a small moveable picture-in-picture window, such as via the picture-in-picture mode in the Android® operating system, or when the user receives a toast notification (window used to display brief, auto-expiring information to the user). When such an event occurs, the user may be prevented from reading or watching the content (e.g., video) desired to be read or watched by the user. For example, the user may be prevented from viewing the sports scores due to the overlap of the application window displaying video with the application window displaying sports scores. Currently, the user must manually reposition the overlapped application window covering up, at least a portion, of the content desired to be read or watched. By manually repositioning the overlapped application window, computing resources (e.g., processing resources) are wasted as well as the user's time. Unfortunately, computing devices do not currently have the functional means for preventing the necessity of the user manually repositioning the overlapped application window(s).

Figure 3A:
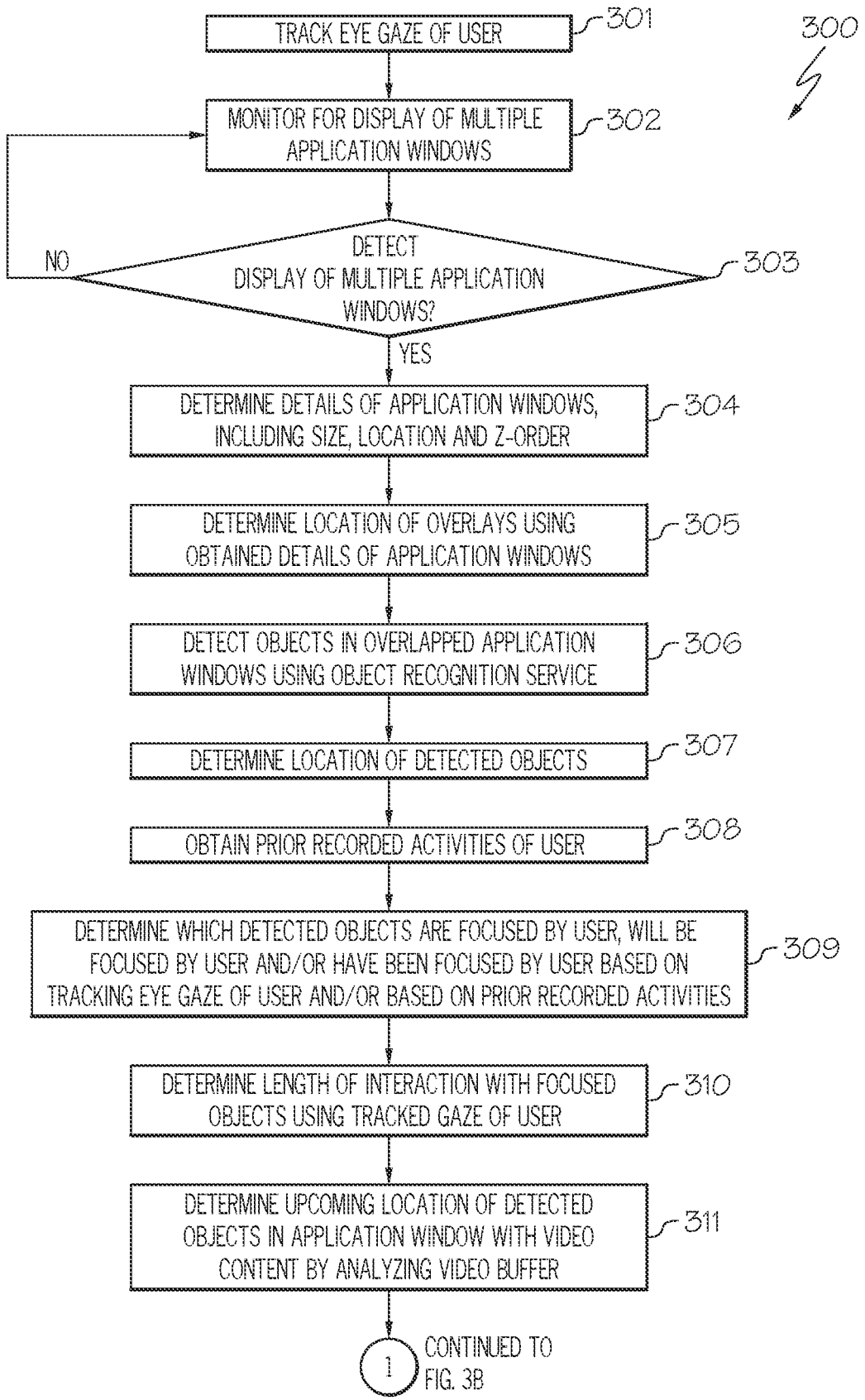
FIGS. 3A-3B are a flowchart of a method for displaying content without obscuring key details on a computer screen in accordance with an embodiment of the present invention.
Figure 3B:
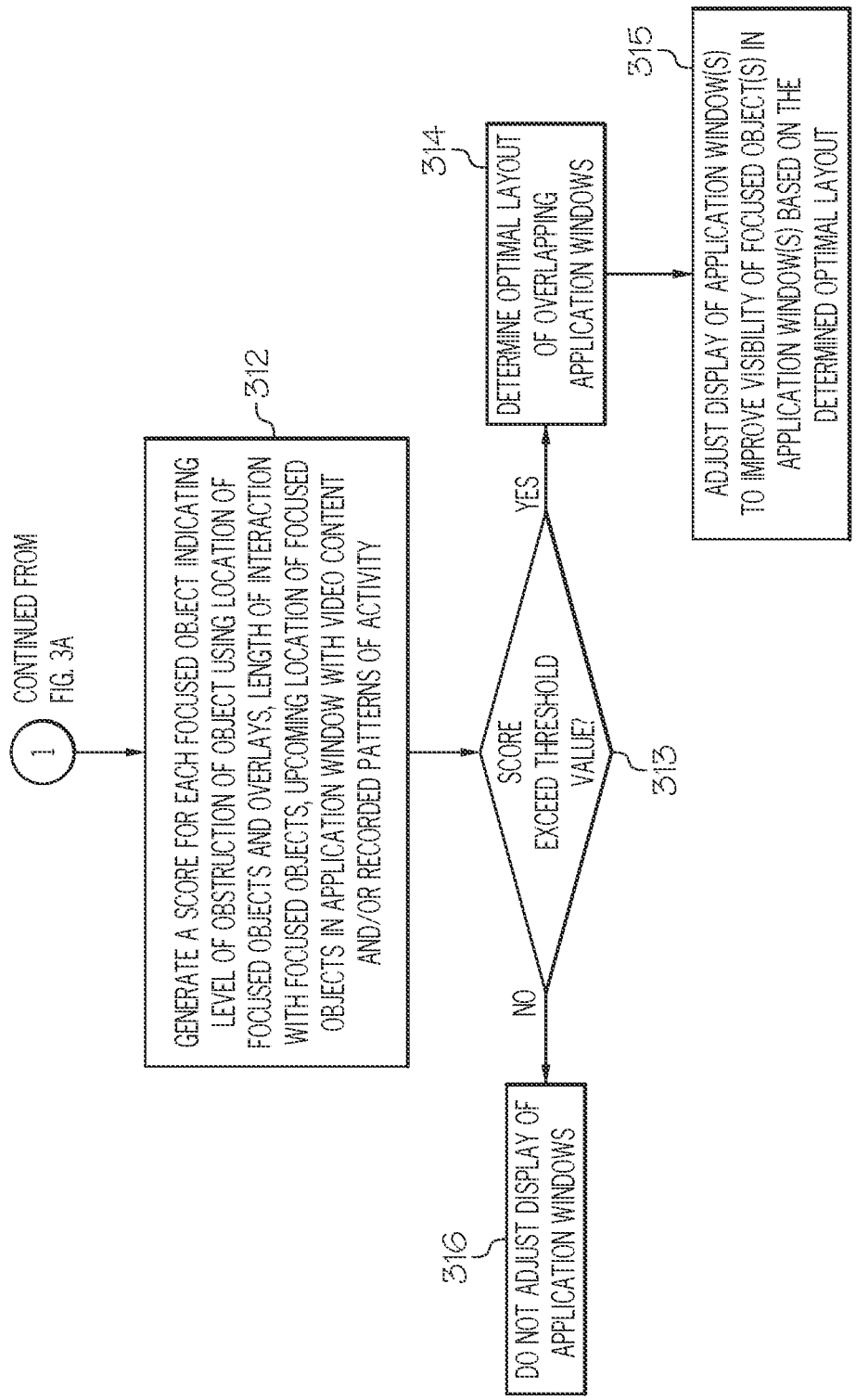
Figure 4:
FIG. 4 illustrates an exemplary video application in a window being watched by a user on the computing device in accordance with an embodiment of the present invention.
Figure 5:
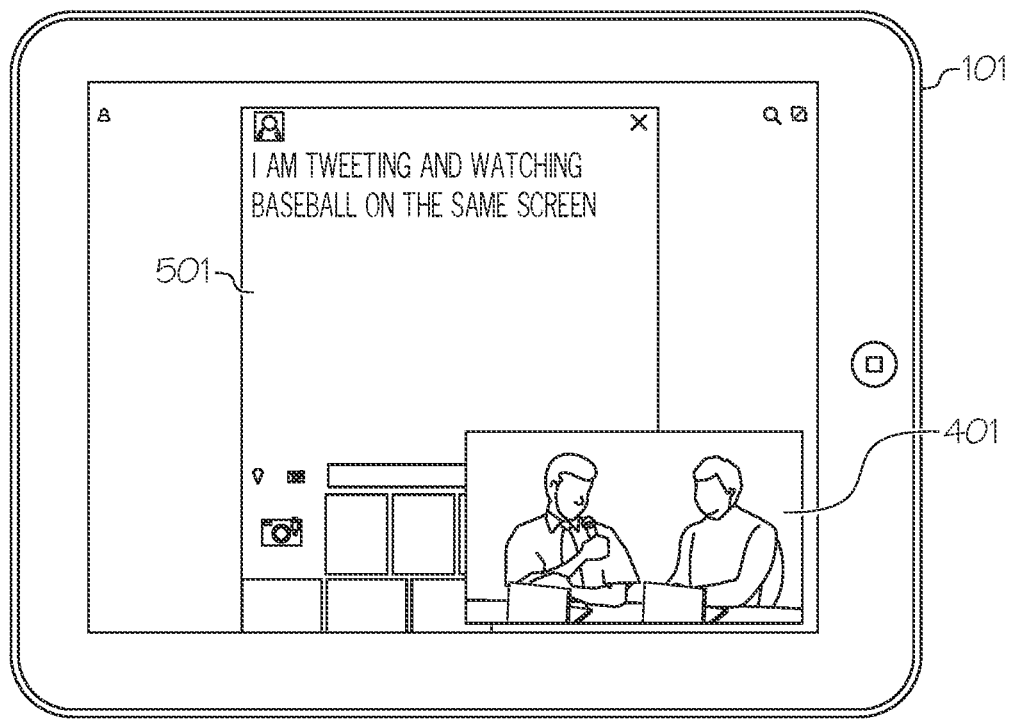
FIG. 5 illustrates an example of overlapping application windows in accordance with an embodiment of the present invention.
Figure 6:
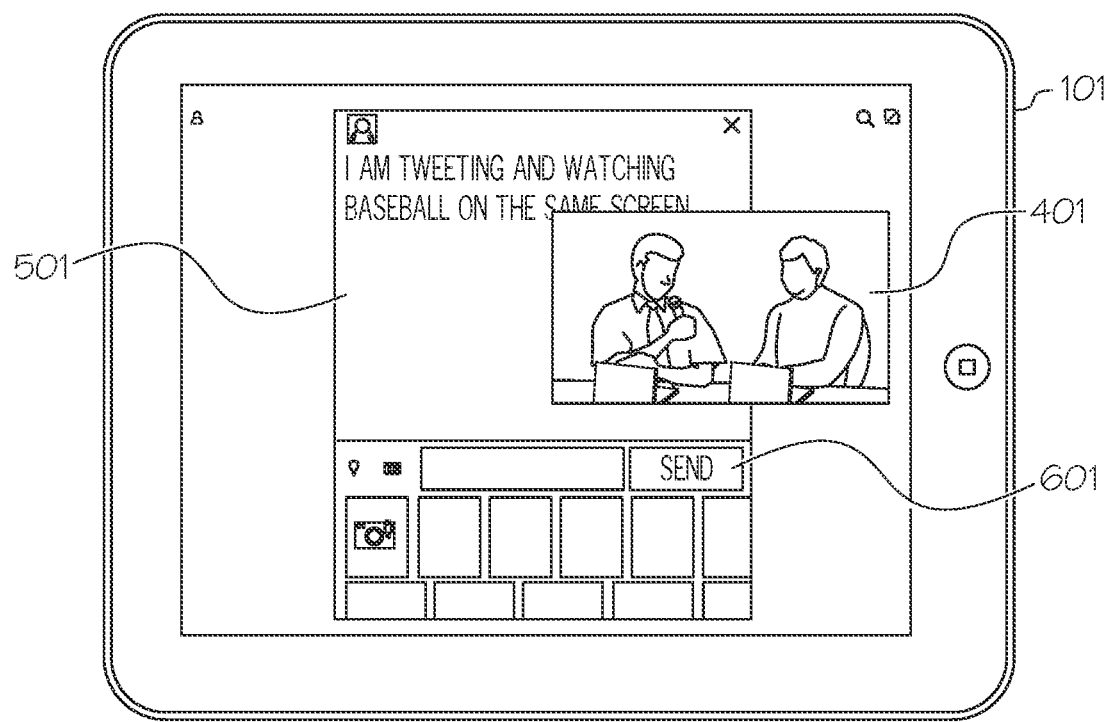
FIG. 6 illustrates an example of adjusting the display of an application window so as to improve visibility of the focused object in accordance with an embodiment of the present invention.

The principles of the present invention provide a means for preventing the necessity of the user from manually repositioning the overlapped application window(s) to avoid obscuring key details thereby improving the way computers operate as discussed below in connection with FIGS. 3A-3B and 4-6. FIGS. 3A-3B are a flowchart of a method for displaying content without obscuring key details on a computer screen. FIG. 4 illustrates an exemplary video application in a window being watched by a user on the computing device. FIG. 5 illustrates an example of overlapping application windows. FIG. 6 illustrates an example of adjusting the display of an application window so as to improve visibility of the focused object.

As stated above, FIGS. 3A-3B are a flowchart of a method 300 for displaying content without obscuring key details on a computer screen in accordance with an embodiment of the present invention.

Referring to FIG. 3A, in conjunction with FIGS. 1-2, in step 301, an eye gaze of user 102 of computing device 101 is tracked. For example, in one embodiment, the eye gaze of user 102 is tracked via an eye tracker 103, including a web camera, or via VR/AR headset 105 connected to computing device 101. In one embodiment, eye tracker 103 or VR/AR headset 105 identifies locations on display 215 that are focused by user 102 based on tracking the eye gaze of user 102, such as in terms of a screen coordinate system (e.g., (x, y) coordinates).

In step 302, computing device 101 monitors for the display of multiple application windows on display 215. In particular, computing device 101 may monitor to detect for "mixed application experiences" on computing device 101. "Mixed application experiences" refer to occurrences when an application window overlaps another application window in such a manner as to obstruct user 102 from viewing content desired to be read or viewed. Such an experience may result from an event initiated by user 102 or otherwise. For example, such an event may occur when the user converts a current window into a small moveable picture-in-picture window, such as via the picture-in-picture mode in the Android® operating system, or when the user receives a toast notification (window used to display brief, auto-expiring information to the user). As a result, the user may be prevented from reading or watching the content (e.g., video) desired to be read or watched by the user. For instance, the user may be prevented from viewing the sports scores due to the overlap of the application window displaying video with the application window displaying sports scores.

In step 303, a determination is made by computing device 101 as to whether the display of multiple application windows has been detected, such as shown in FIGS. 4 and 5.

FIG. 4 illustrates an exemplary video application in window 401 being watched by user 102 on computing device 101 in accordance with an embodiment of the present invention. In the scenario where user 102 converts the current window 401 into a small moveable picture-in-picture window, such as via the picture-in-picture mode, an overlap of application windows may result as shown in FIG. 5.

FIG. 5 illustrates overlapping application windows in accordance with an embodiment of the present invention.

As shown in FIG. 5, application window 401 overlaps other application windows, such as application window 501 (e.g., Twitter® application). When such an overlap of application windows occurs, an application window may obstruct user 102 from viewing content desired to be read or viewed in another application window. For instance, as shown in FIG. 5, application window 401 obstructs user 102 from reading/viewing elements, such as a send button icon, in the application of application window 501. When such a mixed application experience occurs, the present invention adjusts the display of an application window(s) so to improve the visibility, such as the visibility of the focus object(s), as discussed further below.

Returning to step 303, in conjunction with FIGS. 1-2 and 4-5, if the display of multiple application windows has not been detected, then computing device 101 continues to monitor for the display of multiple application windows on display 215 in step 302.

If, however, multiple application windows have been detected, then, in step 304, computing device 101 determines details of the application windows, such as the size, location and z-order (ordering of overlapping two-dimensional objects, such as windows). For example, the size may refer to the width and height of the application window. For instance, the width×height measurement of application window 501 shown in FIG. 5 is 1024×768 pixels; whereas, the width×height measurement of application window 401 shown in FIG. 5 is 320×240 pixels.

In one embodiment, the location may refer to the location of the application window on display 215 of computing device 101, such as in terms of (x, y) coordinates. For example, x, y coordinates are respectively the horizontal and vertical addresses of any pixel or addressable point on a computer display screen (e.g., display 215). For instance, the (x, y) coordinates of application window 501 as shown in FIG. 5 is 0×0; whereas, the (x, y) coordinates of application window 401 as shown in FIG. 5 is 724×528. In one embodiment, the x and y coordinates can also be specified as values relative to any starting point on the screen or any subset of the screen, such as an image.

In one embodiment, the z-order refers to the ordering of overlapping two-dimensional objects, such as windows. For example, an object with a z-order of 1 would be visually "underneath" an object with a z-order of 2 or greater. For example, application window 501 as shown in FIG. 5 has a z-order of 0; whereas, application window 401 as shown in FIG. 5 has a z-order of 1.

In step 305, computing device 101 determines the location of the overlays using the obtained details of the application windows. For example, computing device 101 determines the extent of the area, such as in terms of (x, y) coordinates, where application windows, such as application windows 401, 501, overlap with one another using the obtained details of the application windows in step 304. In one embodiment, computing device 101 determines the location of such overlays by first determining the area of each application window that is displayed on display 215 and then identifying the area occupied by both application windows.

In step 306, computing device 101 detects the objects in the overlapped application windows using an object recognition service, such as OpenCV. In one embodiment, object detection is performing using deep learning along with an object recognition service, such as OpenCV. For example, deep learning methods, such as Faster R-CNNs, You Only Look Once (YOLO) or Single Shot Detectors (SSDs), may be utilized to develop a deep learning object detector using OpenCV.

In step 307, computing device 101 determines the locations of the detected objects. In one embodiment, the object recognition service generates a coordinate map to determine the location of the objects, such as in terms of (x, y) coordinates.

In step 308, computing device 101 obtains the prior recorded activities of user 102, such as from disk unit 208. As discussed above, eye tracker 103 and/or VR/AR headset 105 track activities of user 102, which include patterns of activity.

In step 309, computing device 101 determines which detected objects are being focused by user 102, will be focused by user 102 and/or have been focused by user 102 based on tracking gaze of user 102 and/or based on prior recorded activities. For example, as discussed above, eye tracker 103 or VR/AR headset 105 identifies locations on display 215 that are focused by user 102 based on tracking the eye gaze of user 102, such as in terms of (x, y) coordinates. In one embodiment, such focused locations are determined based on the time that user 102 is gazing at that location. For instance, if user 102 is gazing at a location, such as a location on display 215, that exceeds a threshold amount of time, then such a location is said to be a location focused by user 102, which may correspond to the location of the detected object determined in step 307.

In one embodiment, the focused objects that correspond to the detected objects may be determined based on prior patterns of activity exhibited by user 102. For example, eye tracker 103 may track the user's gaze on display 215 over a period of time (e.g., months). Using such information, computing device 101 may determine that after user 102 watches a video from a particular website, user 102 likes to tweet about what he/she has read in a Twitter® application, which always overlaps the video application window after user 102 converts the video application window into a small moveable picture-in-picture window, such as via the picture-in-picture mode. Such a pattern may be recorded and utilized by computing device 101 to determine focus objects (e.g., typing area in Twitter® application), even prior to user 102 actually performing the step of entering the video application window in picture-in-picture mode.

After determining which locations or objects on display 215 are being focused by user 102 or will be focused by user 102 or have been focused by user 102, a comparison is made to determine if any of those focused locations correspond to the same location (e.g., same (x, y) coordinates) as the detected objects determined in step 307. If there is a match, such as within a threshold degree of an exact match, then the focused location is said to correspond to the location of the detected object. Such detected objects may then be said to correspond to the objects ("focused objects") focused by user 102.

In step 310, computing device 101 determines the length of interaction with the focused objects using the tracked gaze of user 102. As discussed above, eye tracker 103 or VR/AR headset 105 tracks the length of time user 102 is focusing on a particular location on display 215, which may correspond to a focused object, and therefore, determine the length of interaction with the focused object.

In step 311, computing device 101 determines the upcoming location of detected objects in an application window with video content, such as application window 401, by analyzing the video buffer. In one embodiment, the video buffer, which may be stored in memory, such as memory 206, stores upcoming video segments to be displayed by computing device 101. In one embodiment, computing device 101 extracts the upcoming video segments that have not been shown to user 102 in order to determine the elements in the video application window, such as application window 401, that conflict with the overlapping application window, such as application window 501. Such information may be used to determine the amount of adjustment in the display of the application window. For example, certain elements may only be displayed at a certain location (e.g., middle) of the application window. As a result, the application window may be resized such that the sides of the application window are brought closer to the center as opposed to simply moving the application window to a different location. While either the resizing or the location movement may address the user's mixed application experience, it may be preferable to simply resize the application window (or predominately resize the application window as oppose to changing its location) to address the user's mixed application experience to more efficiently utilized the computer screen's real estate.

Furthermore, in one embodiment, by extracting the upcoming video segments that have not been shown to user 102, application windows can be resized prior to an actual occurrence of an overlap of the application windows thereby preventing the user from experiencing the overlap of application windows. That is, in this manner, the overlap of application windows affecting the user's ability to read or watch content may be prevented and hence prevent the repositioning of the application windows thereby lessening the amount of computing resources (e.g., processing resources) that are utilized. That is, the functionality of the computer system is improved by more efficiently utilizing computing resources (e.g., processing resources) by eliminating the requirement to reposition the application window(s) after the occurrence of an overlap of the application windows.

Similarly, by recording patterns of activity as discussed above, the application windows can be resized prior to an actual occurrence of an overlap of the application windows thereby preventing the user from experiencing the overlap of application windows.

Referring now to FIG. 3B, in conjunction with FIGS. 1-2 and 4-5, in step 312, computing device 101 generates a score for each focused object indicating the level of obstruction of the object using the location of the focused objects and overlays, the length of interaction with the focused objects, the upcoming location of the focused objects in the application window with video content and/or recorded patterns of activity. In one embodiment, the score is associated with the level of obstruction of the focused object. For example, the higher the score the more obstructed is the focused object. For instance, the greater overlay of an application window over a focused object, the greater the score. In another example, the greater the length of interaction with the focused object that is obstructed, the greater the score indicating a more valuable object to be read or viewed. In a further example, the recorded patterns of activity may indicate potential overlays of content that the user desires to read or watch. Such focused objects would be assigned a higher score. In another example, the upcoming location of the focused objects in the application window with video content may be assigned a higher score if the focused objects are to be displayed in a location on display 215 that is obstructed from user 102 reading or viewing the object.

In one embodiment, such scores are recorded in a data structure, such as a table, array or graph, which is stored in a memory or data storage unit of computing device 101 (e.g., memory 206, disk unit 208).

In step 313, a determination is made by computing device 101 as to whether the score exceeds a threshold value, which may be user-specified. To be clear, in one embodiment, the score for each of the focused objects is compared against the threshold value, and if one of these scores exceeds the threshold value, then the optimal layout of the overlapping application windows is determined as discussed below.

If the score exceeds the threshold value, then, in step 314, computing device 101 determines the optimal layout of the overlapping application windows. The "optimal layout," as used herein, refers to the layout of the overlapping application windows that eliminates the obstruction of focused object(s) while using a minimal amount of area on display 215.

In one embodiment, the optimal layout is determined by continuously adjusting the size and/or the location and/or the z-order of the overlapping application window(s) and continuously analyzing the application windows after said adjustment to determine the level of obstruction of the focused object(s). After the minimal amount of obstruction of the focused object(s) is determined using the minimal amount of area on display 215, the overlapping application window(s) is adjusted accordingly in step 315. That is, in step 315, computing device 101 adjusts the display of the application window(s) to improve the visibility of the focused object(s) in the application window(s) based on the determined optimal layout, such as shown in FIG. 6.

FIG. 6 illustrates an example of adjusting the display of an application window so as to improve visibility of the focused object in accordance with an embodiment of the present invention.

As shown in FIG. 6, the display of application window 401 was adjusted so to prevent the obstruction of user 102 from viewing the send button icon 601, which may be utilized by user 102 to post the message on Twitter®. For example, the send button icon 601 may have been determined to be a focused object based on the user previously gazing at the send button icon 601 prior to watching the video in application window 401 and/or based on recorded patterns of activity in which user 102 typically posts a message on Twitter® after watching a video. Based on the degree of overlap of application window 401 on application window 501 preventing user 102 from reading/viewing content, such as the send button icon 601, computing device 101 adjusted the display of application window 401 so as to allow the user to easily read/view the obstructed content, such as the send button icon 601. In this manner, a key action, such as posting a message on Twitter®, will not be missed by user 102. That is, in this manner, the next logical step, such as posting a message on Twitter®, will not be inadvertently missed by user 102.

In one embodiment, the optimal layout of the overlapping application windows is determined by taking into consideration the so-called "ripple effect." The "ripple effect," refers to the shifting of the content to make it visible. Certain shifts may cause more content to be visible than other shifts, which is taken into consideration when determining the optimal layout of the overlapping application windows. Furthermore, other factors, such as reading or interaction speed, which may be deduced by eye tracker 103 or VR/AR headset 105, is used to determine an optimal layout. For example, certain layouts may be more accommodating to improve the reading or interaction speed than other layouts.

In one embodiment, the optimal layout takes into consideration a priority assigned to the content displayed in the overlapping application windows. For example, an important news story, whether national or local, may be ensured to have a larger area presence on display 215 versus other content displayed in the overlapping application windows. In one embodiment, such a priority may be user-specified or determined by an administrator. In one embodiment, such a priority may be determined based on the source of the content, such as content from a government entity automatically having the highest priority. In one embodiment, computing device 101 utilizes natural language processing when analyzing the content to be displayed in the overlapping application windows to determine a level of priority based on identifying keywords in the content. In one embodiment, such keywords may be associated with a priority. For example, the keyword of "president" may be associated with a high priority. In one embodiment, the association of keywords to a priority may be established by user 102 or an administrator, where such an association is stored in a data structure, which may reside in memory (e.g., memory 205) or in a data storage unit (e.g., disk unit 208).

Returning to step 313, if, however, the score does not exceed the threshold value, then, in step 316, computing device 101 does not adjust the display of the application windows.

In this manner, the functionality or capability of computing systems is improved by preventing the user from having to manually reposition overlapped application windows. Furthermore, by preventing such manual repositioning, computing resources (e.g., processing resource) are not being wasted for such maneuvers thereby more efficiently utilizing computing resources.

Furthermore, as discussed above, computing devices do not currently have the functional means for preventing the necessity of the user manually repositioning the overlapped application windows. The present invention provides a technological solution to this technical problem by adjusting the display of application window(s), including prior to an actual occurrence of an overlap of the application windows, appropriately so as to improve visibility of the focus object(s) in the application window(s).

Furthermore, the present invention improves the technology or technical field involving computing devices. As discussed above, computing devices may currently display content that is obstructed by an overlapped application window. Users currently have to manually reposition the overlapped application window(s) which results in lost time for the user as well as the wastefulness of computing resources (e.g., processing resources). The present invention improves such technology by preventing the user from having to manually reposition overlapped application windows. Furthermore, by preventing such manual reposition, computing resources (e.g., processing resource) are not being wasted for such maneuvers thereby more efficiently utilizing computing resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for displaying content without obscuring key details on a computer screen, the method comprising:

determining details of application windows;

determining a location of overlays between said application windows using said determined details of said application windows;

detecting objects in said application windows using an object recognition service;

determining a location of said detected objects;

determining which of said detected objects are focused by a user based on tracking eye gaze of said user or prior recorded activities of said user;

generating a score for each of one or more focused objects indicating a level of obstruction using said location of said detected objects which correspond to focused objects and said location of overlays between said application windows;

determining an optimal layout of said overlapped application windows in response to said score for one or more of said one or more focused objects exceeding a threshold value; and adjusting a display of one or more of said application windows to improve visibility of said one or more of said one or more focused objects using said determined optimal layout.

2. The method as recited in claim 1 further comprising:

determining a length of interaction with said one or more focused objects using said tracked eye gaze of said user; and generating said score for each of said one or more focused objects indicating said level of obstruction using said location of said detected objects which correspond to focused objects, said location of overlays between said application windows and said length of interaction with said one or more focused objects.

3. The method as recited in claim 1 further comprising:

obtaining said prior recorded activities of said user; and generating said score for each of said one or more focused objects indicating said level of obstruction using said location of said detected objects which correspond to focused objects, said location of overlays between said application windows and said prior recorded activities of said user.

4. The method as recited in claim 1, wherein determining said optimal layout of said overlapped application windows comprises:

adjusting size and/or location and/or z-order of one or more of said application windows; and analyzing said application windows after adjusting said size and/or location and/or z-order of said one or more of said application windows to determine said level of obstruction of said one or more focused objects.

5. The method as recited in claim 1, wherein said details of said application windows comprise a size, a location and a z-order.

6. The method as recited in claim 1 further comprising:
  determining an upcoming location of one or more of said detected objects in an application window with video content by analyzing a video buffer; and
  generating said score for each of said one or more focused objects indicating said level of obstruction using said location of said detected objects which correspond to focused objects, said location of overlays between said application windows and said upcoming location of said one or more detected objects in said application window with video content.

7. The method as recited in claim 1, wherein said eye gaze of said user is tracked via a web camera or an augmented reality device.

8. A computer program product for displaying content without obscuring key details on a computer screen, the computer program product comprising one or more computer readable storage mediums having program code embodied therewith, the program code comprising programming instructions for:
  determining details of application windows;
  determining a location of overlays between said application windows using said determined details of said application windows;
  detecting objects in said application windows using an object recognition service;
  determining a location of said detected objects;
  determining which of said detected objects are focused by a user based on tracking eye gaze of said user or prior recorded activities of said user;
  generating a score for each of one or more focused objects indicating a level of obstruction using said location of said detected objects which correspond to focused objects and said location of overlays between said application windows;
  determining an optimal layout of said overlapped application windows in response to said score for one or more of said one or more focused objects exceeding a threshold value; and
  adjusting a display of one or more of said application windows to improve visibility of said one or more of said one or more focused objects using said determined optimal layout.

9. The computer program product as recited in claim 8, wherein the program code further comprises the programming instructions for:
  determining a length of interaction with said one or more focused objects using said tracked eye gaze of said user; and
  generating said score for each of said one or more focused objects indicating said level of obstruction using said location of said detected objects which correspond to focused objects, said location of overlays between said application windows and said length of interaction with said one or more focused objects.

10. The computer program product as recited in claim 8, wherein the program code further comprises the programming instructions for:
  obtaining said prior recorded activities of said user; and
  generating said score for each of said one or more focused objects indicating said level of obstruction using said location of said detected objects which correspond to focused objects, said location of overlays between said application windows and said prior recorded activities of said user.

11. The computer program product as recited in claim 8, wherein determining said optimal layout of said overlapped application windows comprises:
  adjusting size and/or location and/or z-order of one or more of said application windows; and
  analyzing said application windows after adjusting said size and/or location and/or z-order of said one or more of said application windows to determine said level of obstruction of said one or more focused objects.

12. The computer program product as recited in claim 8, wherein said details of said application windows comprise a size, a location and a z-order.

13. The computer program product as recited in claim 8, wherein the program code further comprises the programming instructions for:
  determining an upcoming location of one or more of said detected objects in an application window with video content by analyzing a video buffer; and
  generating said score for each of said one or more focused objects indicating said level of obstruction using said location of said detected objects which correspond to focused objects, said location of overlays between said application windows and said upcoming location of said one or more detected objects in said application window with video content.

14. The computer program product as recited in claim 8, wherein said eye gaze of said user is tracked via a web camera or an augmented reality device.

15. A system, comprising:
  a memory for storing a computer program for displaying content without obscuring key details on a computer screen; and
  a processor connected to said memory, wherein said processor is configured to execute program instructions of the computer program comprising:
    determining details of application windows;
    determining a location of overlays between said application windows using said determined details of said application windows;
    detecting objects in said application windows using an object recognition service;
    determining a location of said detected objects;
    determining which of said detected objects are focused by a user based on tracking eye gaze of said user or prior recorded activities of said user;
    generating a score for each of one or more focused objects indicating a level of obstruction using said location of said detected objects which correspond to focused objects and said location of overlays between said application windows;
    determining an optimal layout of said overlapped application windows in response to said score for one or more of said one or more focused objects exceeding a threshold value; and
    adjusting a display of one or more of said application windows to improve visibility of said one or more of said one or more focused objects using said determined optimal layout.

16. The system as recited in claim 15, wherein the program instructions of the computer program further comprise:
  determining a length of interaction with said one or more focused objects using said tracked eye gaze of said user; and
  generating said score for each of said one or more focused objects indicating said level of obstruction using said location of said detected objects which correspond to focused objects, said location of overlays between said application windows and said length of interaction with said one or more focused objects.

17. The system as recited in claim 15, wherein the program instructions of the computer program further comprise:
obtaining said prior recorded activities of said user; and
generating said score for each of said one or more focused objects indicating said level of obstruction using said location of said detected objects which correspond to focused objects, said location of overlays between said application windows and said prior recorded activities of said user.

18. The system as recited in claim 15, wherein determining said optimal layout of said overlapped application windows comprises:
adjusting size and/or location and/or z-order of one or more of said application windows; and
analyzing said application windows after adjusting said size and/or location and/or z-order of said one or more of said application windows to determine said level of obstruction of said one or more focused objects.

19. The system as recited in claim 15, wherein said details of said application windows comprise a size, a location and a z-order.

20. The system as recited in claim 15, wherein the program instructions of the computer program further comprise:
determining an upcoming location of one or more of said detected objects in an application window with video content by analyzing a video buffer; and
generating said score for each of said one or more focused objects indicating said level of obstruction using said location of said detected objects which correspond to focused objects, said location of overlays between said application windows and said upcoming location of said one or more detected objects in said application window with video content.

* * * * *